United States Patent
Yoshida

(10) Patent No.: US 7,641,956 B2
(45) Date of Patent: Jan. 5, 2010

(54) HONEYCOMB STRUCTURE

(75) Inventor: Yutaka Yoshida, Gifu (JP)

(73) Assignee: Ibiden Co. Ltd., Gifu (JP)

( * ) Notice: Subject to any disclaimer, the term of this patent is extended or adjusted under 35 U.S.C. 154(b) by 110 days.

(21) Appl. No.: 11/398,602

(22) Filed: Apr. 6, 2006

(65) Prior Publication Data

US 2006/0225390 A1    Oct. 12, 2006

(30) Foreign Application Priority Data

Apr. 7, 2005  (JP) ............................. 2005-110712

(51) Int. Cl.
  *B32B 3/12*  (2006.01)
(52) U.S. Cl. .................. 428/116; 428/688; 502/527.19
(58) Field of Classification Search ................. 428/403, 428/407, 116, 117, 118, 426; 55/523; 502/439, 502/527.19
See application file for complete search history.

(56) References Cited

U.S. PATENT DOCUMENTS

| | | | |
|---|---|---|---|
| 4,297,140 A | 10/1981 | Paisley | |
| 6,250,110 B1 | 6/2001 | Boulos et al. | |
| 6,818,297 B1 * | 11/2004 | Atarashi et al. | 428/403 |
| 7,396,586 B2 | 7/2008 | Ohno et al. | |
| 2004/0045267 A1 | 3/2004 | Ichikawa et al. | |
| 2004/0101654 A1 * | 5/2004 | Hijikata | 428/116 |
| 2004/0234428 A1 * | 11/2004 | Tanahashi et al. | 422/180 |
| 2006/0021310 A1 | 2/2006 | Ohno et al. | |
| 2006/0051556 A1 | 3/2006 | Ohno et al. | |
| 2006/0216467 A1 | 9/2006 | Yoshida | |
| 2006/0230732 A1 | 10/2006 | Kunieda | |
| 2007/0020155 A1 | 1/2007 | Ohno et al. | |
| 2007/0057903 A1 | 3/2007 | Tsumura | |
| 2007/0068128 A1 | 3/2007 | Oshimi et al. | |
| 2007/0128405 A1 | 6/2007 | Sakaguchi et al. | |
| 2007/0130897 A1 | 6/2007 | Sakaguchi et al. | |
| 2007/0169453 A1 | 7/2007 | Hayakawa | |
| 2007/0178275 A1 | 8/2007 | Takahashi | |
| 2007/0196620 A1 | 8/2007 | Ohno et al. | |

(Continued)

FOREIGN PATENT DOCUMENTS

EP    1 489 277 A1    12/2004

(Continued)

OTHER PUBLICATIONS

Kunieda translation http://v3.espacenet.com/textdoc?DB=EPODOC&IDX=WO2004031100&F=0&QPN=WO.*

(Continued)

*Primary Examiner*—Timothy M Speer
*Assistant Examiner*—Lauren Robinson
(74) *Attorney, Agent, or Firm*—Finnegan, Henderson, Farabow, Garrett & Dunner LLP

(57) ABSTRACT

The honeycomb structure is an aggregate type honeycomb formed from a plurality of cells assembled together side by side laterally and cell walls isolating adjacent ones of the cells from each other by joining with a sealant layer (adhesive layer) or integral type honeycomb monolith, and a sealant layer (coating layer) provided on the outer surface of the aggregate type honeycomb or the integral type honeycomb monolith. The sealant layer (adhesive layer) or a sealant layer (coating layer) formed on the outer surface of aggregate type honeycomb or the integral type honeycomb monolith contains oxide particles, inorganic binder and a coloring agent.

18 Claims, 4 Drawing Sheets

U.S. PATENT DOCUMENTS

| | | |
|---|---|---|
| 2007/0212517 A1 | 9/2007 | Ohno et al. |
| 2007/0293392 A1 | 12/2007 | Ohno et al. |
| 2008/0083202 A1 | 4/2008 | Kunieda |
| 2008/0120950 A1 | 5/2008 | Ohno et al. |
| 2008/0136062 A1 | 6/2008 | Kasai et al. |
| 2008/0174039 A1 | 7/2008 | Saijo et al. |
| 2008/0190081 A1 | 8/2008 | Oshimi |
| 2008/0190083 A1 | 8/2008 | Oshima |
| 2008/0211127 A1 | 9/2008 | Naruse |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0241015 A1 | 10/2008 | Kudo et al. |
| 2008/0241444 A1 | 10/2008 | Oshima |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai |

FOREIGN PATENT DOCUMENTS

| | | | |
|---|---|---|---|
| JP | 08-028246 | | 1/1996 |
| JP | 2002-348740 | | 12/2002 |
| JP | 2003-214156 | * | 7/2003 |
| WO | WO-2004-031100 | * | 4/2004 |

OTHER PUBLICATIONS

Kunieda translation 2 http://v3.espacenet.com/textdes?DB=EPODOC&IDX=WO2004031100&F=0&QPN=WO.*

Hiroaki translation http://www4.ipdl.inpit.go.jp/cgi-bin/tran_web_cgi_ejje?atw_u=http%3A%2F%2Fwww4.ip.*

European Search Report dated Jul. 13, 2006 (re 06290463.6-2111).

European Search Report dated Jul. 13, 2006 (re 06290561.7-2111).

Japanese JIS Z 8729 (2004) is an updated version of JIS Z 8729 (CIE(1976)), the'contents of documents are understood to be the same, Colour specification-CIELAB and CIELUV colour spaces, Japanese Industrial Standards, 24 pages.

Japanese JIS Z 8105 (2000), Glossary of colour terms, Japanese Industrial Standard, 46 pages.

Japanese JIS Z 8722 (2000), Methods of colour measurement-Reflecting and transmitting objects, Japanese Industrial Standard, 57 pages.

Japanese JIS Z 8701 (1999), Colour specification-The CIE 1931 standard colorimetric system and the CIE 1964 supplementary standard colorimetric system, Japanese Industrial Standard, 19 pages.

* cited by examiner

Cross-sectional view taken along the A—A line

Cross-sectional view taken along the B—B line

HONEYCOMB STRUCTURE

CROSS REFERENCE TO RELATED APPLICATION

This application claims benefits of priority based on the Japanese Patent Application No. 2005-110712 filed in the Japanese Patent Office on Apr. 7, 2005, the disclosure of which is incorporated herein by reference in its entirety.

FIELD OF THE INVENTION

The present invention generally relates to a honeycomb structure, and more particularly to a ceramic honeycomb structure suitably usable in an apparatus for purification of exhaust gas from an internal engine used on an automobile.

BACKGROUND ART

The honeycomb structures used in the exhaust gas purification apparatuses for the automotive internal engines include a monolith type one, an aggregate type one formed a plurality of honeycomb units joined together with a sealant, and the like.

Many of the aggregate type honeycomb structures use the sealant (adhesive) to integrally assemble the honeycomb units together. As the sealant, there is used a mixture of, for example, ceramic particles of carbide, nitride or the like, which is high in thermal conductivity for an increased regeneration efficiency, and an inorganic binder as an additive (as in the Japanese Unexamined Patent Publication No. 28246/1996). The honeycomb structure disclosed in the Japanese Unexamined Patent Publication No. 28246/1996 uses a ceramic having a high thermal conductance as the sealant to join the honeycomb units together.

SUMMARY OF THE INVENTION

The present invention provides an aggregate type honeycomb structure formed from a honeycomb block formed by assembling together honeycomb units each including a plurality of cells assembled together side by side longitudinally and cell walls isolating adjacent ones of the cells from each other by joining with a sealant layer laid between the honeycomb units, wherein the sealant layer containing oxide particles, inorganic binder and a coloring agent.

Furthermore, the present invention provides an integral type honeycomb structure including a honeycomb monolith formed from a plurality of cells assembled together longitudinally side by side and cell walls isolating adjacent ones of the cells from each other, and a sealant layer provided on the outer surface of the honeycomb monolith, wherein the sealant layer containing oxide particles, inorganic binder and a coloring agent.

Note that the present invention is advantageous in that: the honeycomb block has the outermost surface thereof surrounded with the sealant layer; the sealant layer has a color whose psychometric lightness (L*) specified in JIS Z 8729 (CIE (1976)) is about 86.00 or less; the coloring agent comprises one or more selected from among inorganic metal compounds consisting of ion oxide, copper oxide, $CoO.nAl_2O_3$, $CO_3(PO_4)_2$ and other cobalt compound; the oxide particle comprises any one of alumina, zirconia, titania and silica; the cells are closed at one of the opposite ends thereof with a plug; the honeycomb unit or honeycomb monolith carries a catalyst component; and the honeycomb structure is used as an on-vehicle exhaust gas purifying apparatus.

The contents of the Japanese Unexamined Patent Publication No. 28246/1996 are incorporated herein by reference in their entirety.

DETAILED DESCRIPTION OF THE PREFERRED EMBODIMENTS

Figure 1:
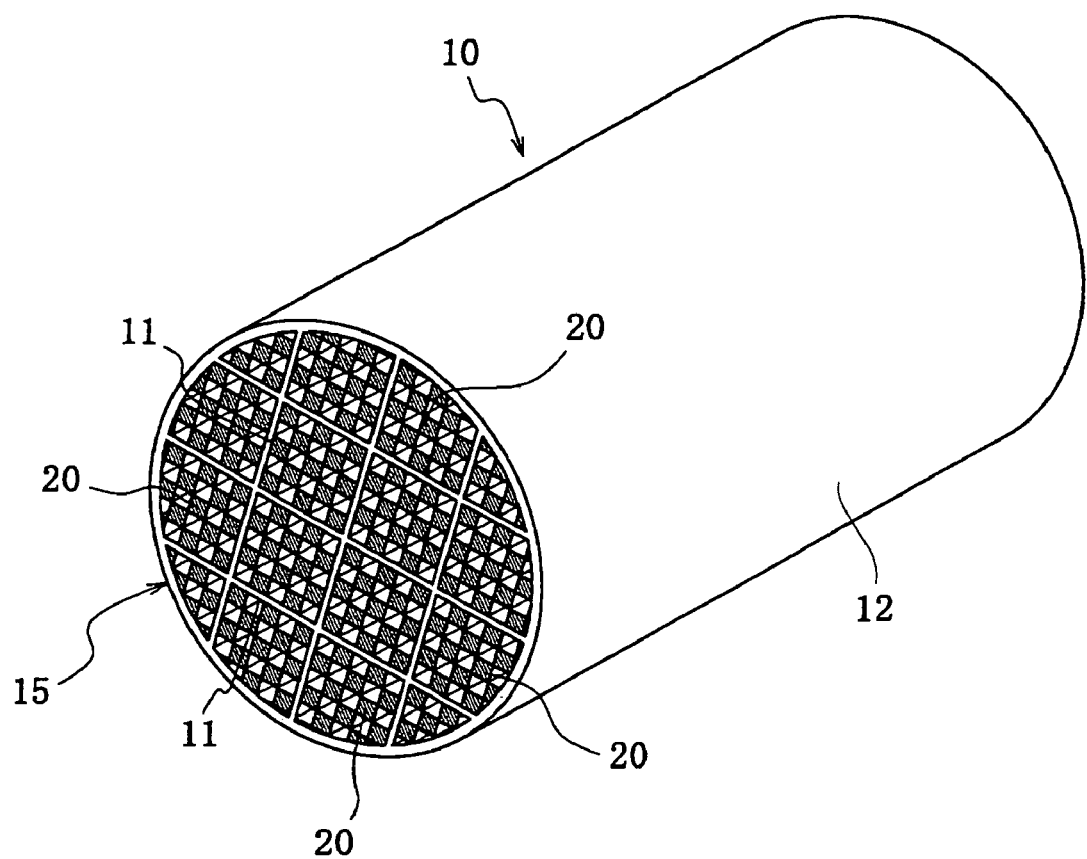
FIG. 1 is a perspective view of the aggregate type honeycomb structure according to the present invention.

The inventors of the present invention made experiments on the honeycomb structure in which the honeycomb units are joined to each other with the sealant for heat resistance and durability with the heating-up performance and performance of exhaust gas purification being taken in consideration. They found from the results of the experiments that coloring of the sealant layer improved the warmth retaining property of a honeycomb structure-made filter. That is, the present invention is characterized in that the sealant (adhesive) made of ceramic particles of a white oxide is to be colored with a coloring agent. It was revealed from the experiment results that use of the colored sealant considerably improved the warmth retaining property of the honeycomb structure.

The inventors inferred that in the honeycomb structure, the sealant layer, when colored as above, will have a color whose psychometric lightness (L*) is lower (darker color).

Generally, the lightness as the reference of the brightness of a material will be higher as light incident upon an object is reflected more. Also, three primary colors of a color material (in subtractive color mixing) can be represented by three colors: cyan (greenish blue), magenta (purplish red) and yellow. Since the cyan absorbs red (orange) whose wavelength is in the long-wave band (600 to 700 nm), it will emit greenish blue light. Since the magenta absorbs green (yellow) whose wavelength is in the medium-wave band (400 to 500 nm), it will emit purplish red light. Since the yellow absorbs blue (purple) whose wavelength is in the short-wave band (300 to 400 nm), it will emit yellow light.

Since the colors absorb the light of their wavebands as above when they are mixed together, their reflection will absolutely be smaller. Therefore, a color like white will be easy to reflect. The above has been believed to be applicable to visible rays of light alone, but the Inventors found through their experiments that the above is also true for the rays of light in other wavebands such as ultraviolet ray.

The inventors' findings revealed that even if the matrix component of the sealant layer is white, addition of a coloring agent to the matrix component to lower the brightness of the sealant layer will enable the outer surface and rear side (gas outlet) of a honeycomb structure to retain heat highly effectively.

More particularly, the exhaust gas from an engine or the like is of a high temperature because the molecules themselves in the exhaust gas have high thermal energy. Generally, the exhaust gas molecules collide with the honeycomb structure (filter) used in the exhaust gas purifying apparatus, that contacts the exhaust gas, and the heat is conducted to the honeycomb structure which will thus reach a high temperature.

The inventors of the present invention inferred that the filter once heated as above radiates heat as an electromagnetic wave and, for inhibition of such heat radiation, it is effective to lower the filter brightness by coloring the filter. Lowering the filter brightness is also effective to inhibit generation of visible rays of light and other electromagnetic waves. Thus, the filter will have an improved effect of keeping warm and the catalytic activity and combustion efficiency for purification of the exhaust gas and removal of particulates will be improved.

Note that CIE (1976) pyschometric lightness (L*) is a numerical value of a material specified in the JIS standard JIS Z 8105 (2000), and more specifically, it is a numerical value defined by the following values as in the standard JIS Z 8729 (2004):

$$L^* = 116(Y/Y_n)^{1/3} - 16 \text{ (when } Y/Y_n > 0.008856\text{); and}$$

$$L^* = 903.29(Y/Y_n) \text{ (when } Y/Y_n \leq 0.008856\text{)}$$

where Y is a tristimulus value Y or $Y_{10}$ in XYZ color system or $X_{10}Y_{10}Z_{10}$ color system, respectively, and $Y_n$ is a value Y or $Y_{10}$ defined by the standard illuminant and auxiliary standard illuminant of a perfect reflector.

Note that the XYZ color system or $X_{10}Y_{10}Z_{10}$ color system is specified in the standard JIS Z 8701 (1999). More specifically, the pyschometric lightness (L*) can be determined by the spectrophotometric colorimetry and tristimulus value direct reading as specified in the standard JIZ Z 8722 (2000). The CIE (1976) pyschometric lightness (L*) is represented by any of the numerical values 0 to 100 and can be calculated down to two places of decimals. The greater the numerical value, the higher the brightness is. On the contrary, the smaller the numerical value, the lower the brightness is. It should be noted that the present invention is based on the method of numerical value calculation as specified in the above standards.

The contents of JIS Z 8105 (2000), JIS Z 8729 (2004), JIS Z 8701 (1999, JIS Z 8722 (2000) and CIE 1976 are incorporated herein by reference in their entirety.

The coloring agent used in the present invention contains a pigment and dye. The pigment is not soluble in water or the like. It includes organic and inorganic ones. An organic pigment of phthalocyanine, dioxazine or anthraquinone origin, more specifically, quinacridone, Watchung Red, dioxazine violet or the like, is suitably usable as the organic pigment. Also, as the inorganic pigment, there may be used an iron oxide (red iron oxide: $Fe_2O_3$), copper oxide, carbon, barium sulfate ($BaSO_4$), vermilion (HgS) cadmium red (Cod(S, Se)), chrome yellow ($PbCrO_4$), ultramarine ($2Al_2Na_4Sl_3O_4$), cobalt compound (cobalt blue: $CoO.nAl_2O_3$, cobalt purple: $CO_3(PO_4)_2$ etc.), zinc-chromate ($K_2O.4ZnO.4CrO_3.3H_2O$, $ZnCrO_4.4Zn(OH)_2$) or the like.

The dye should preferably be soluble in water and well adherent to inorganic particles (oxide particles). As the dye, there may be used, for example, an azo dye, anthraquinone dye, indigoid dye, sulfide dye, triphenyl methane dye, pyrazolone dye, stilbene dye, diphenyl methane dye, alizarin dye, acridine dye, quinonimine dye, azine dye, oxazine dye, thiazin dye, thiazole dye, methine dye, nitro dye, nitroso dye or the like.

According to the present invention, a sealant containing white oxide ceramic particles may be used as the base and colored by adding a coloring agent to prepare the sealant layer having a desirable pyschometric lightness (L*), which is based on the inventors' inference which will be given below:

The oxide ceramic particle includes gas bubbles, lattice defect, OH group, etc. which will scatter light. Thus, when the light impinges an oxide particle, it will be scattered to appear white. At this time, rays of light having wavelengths in various wavebands, for example, infrared rays, will be scattered (reflected) On the contrary, if the sealant layer is colored, light coming in the sealant layer is not apt to easily be scattered even when it impinges the oxide particle. That is, the coloring of the sealant layer will enable the oxide ceramic particles and coloring agent to efficiently absorb light energy, and thus the light energy can efficiently be converted into thermal energy.

Namely, the darker the color of the material (sealant layer) the more easily the material can absorb electromagnetic energy (radiant heat) generated by combustion of a hot exhaust gas, especially, heat rays of large wavelength (visible rays of light in addition to infrared rays). Thus, the sealant layer will be improved in rate of heat transfer by radiation and hence in warmth retaining property. Therefore, the honeycomb structure will have an improved performance of exhaust gas purification.

In the above honeycomb structure according to the present invention, since the sealant layer provided between the honeycomb units or sealant layer (coating layer) on the outer surface of the honeycomb block or honeycomb monolith has the color thereof darkened due to the added coloring agent, the performance of the exhaust gas purification can be improved without deterioration of the heating-up performance. Also, since the sealant layer ceramic particles of a white oxide, the honeycomb structure will not have the temperature thereof easily lowered and can uniformly be heated appropriately. Thus, the honeycomb structure can considerably be improved in performance of purification.

The present invention will be illustrated and explained in detail below concerning honeycomb structures of an aggregate type and integral type.

The aggregate type honeycomb structure is the first embodiment of the present invention. It is formed from a honeycomb block formed by assembling a plurality of honeycomb units together in the form of a pillar with a sealant layer laid between adjacent honeycomb units. Each of the honeycomb units is a pillar-shaped honeycomb ceramic member formed from a plurality of cells (through-hole) assembled together longitudinally side by side with a cell wall laid between adjacent cells.

On the other hand, the integral type honeycomb structure is the second embodiment of the present invention. It is formed as a single unit, namely, as a honeycomb monolith.

Figure 2A:
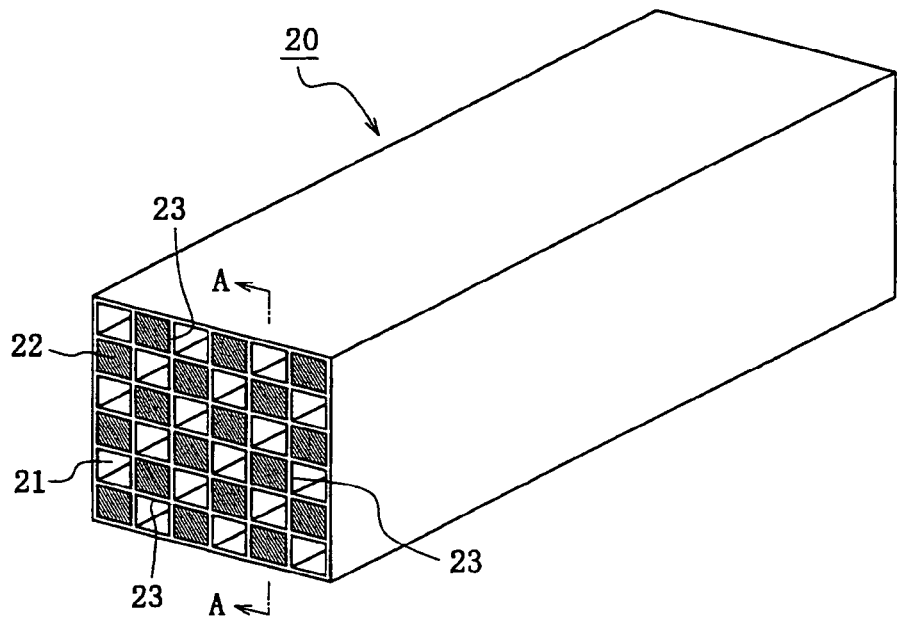
FIG. 2(a) is a perspective view of the honeycomb unit used in the aggregate type honeycomb structure.
Figure 2B:
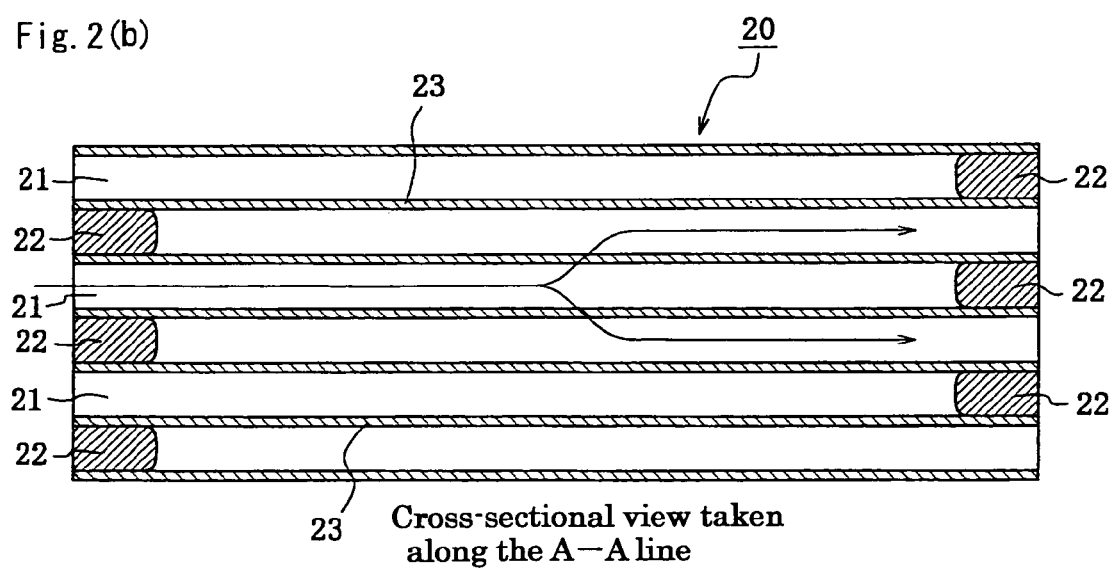
FIG. 2(b) is a sectional view taken along the line A-A in FIG. 2(a).

Referring now to FIG. 1, there is schematically illustrated in the form of a perspective view an example of the aggregate type honeycomb structure as a first embodiment of the present invention. It is generally indicated with a reference numeral 10. FIG. 2(a) is a perspective view of an example of each of the honeycomb units forming together the honeycomb structure shown in FIG. 1, and FIG. 2(b) is a sectional view taken along the line A-A in FIG. 2(a). The honeycomb unit is generally indicated with a reference numeral 20. The honeycomb unit 20 has a plurality of cells 21 (through-hole) formed extending from this side to that side. These cells 21 are laid side by wide each being separated from the other by a cell wall 23 to form together a honeycomb structure. Also, the honeycomb structure may be closed at opposite ends of the cells 21 with a plug 22 to have checkered-pattern ends as necessary, for example, for the purpose of removing particulates in the exhaust gas from a diesel engine or the like.

A bundle of the plurality of honeycomb units 20 combined longitudinally side by side and joined to each other with a sealant layer 11 laid between adjacent ones is referred to herein as the "honeycomb block" 15. Between the outermost surface of the honeycomb block 15 and a stainless steel-made casing, there should desirably be provided a sealant layer (will be referred to as "coating layer" hereunder) 12 to reinforce the honeycomb block and prevent exhaust gas from leaking. The honeycomb units 20 are assembled together to form the honeycomb block 15, and the coating layer 12 is provided over the surface of the honeycomb block 15 to form the aggregate type honeycomb structure. Even if the individual honeycomb units 20 are low in mechanical strength, thermal shock resistance, etc., the existence of the sealant layer 11 and coating layer 12 improves the thermal shock resistance and vibration resistance of the aggregate type honeycomb structure as a whole.

That is, the aggregate type honeycomb structure is high in thermal shock resistance and vibration resistance as above. It is inferred that even if a temperature distribution is caused to arise by an abrupt change in temperature or the like, the existence of the sealant layer 11 and coating layer 12 minimizes the difference in temperature between the honeycomb units 20 and the layers 11 and 12 absorb the thermal shock and vibration. Also, even if a crack has arisen in the honeycomb unit 20 due to a thermal stress or the like, the sealant layer 11 and coating layer 12 effectively block the crack from spreading over the entire honeycomb structure. Further, the outermost sealant layer, that is, the coating layer 12, plays a roll of a protective frame for the honeycomb structure and is effective to maintain the shape of the honeycomb structure for a long term, namely, to improve the durability of the honeycomb structure.

Note that the honeycomb unit 20 should preferably be formed for easy joining between each other. For example, the section of the honeycomb unit 20, perpendicular to the length of the cells (will be referred to as "unit section" hereunder) should desirably be square, rectangular or hexagonal. Also, the unit section may be fan-shaped.

Also, the honeycomb unit 20 should preferably have a sectional area of about 5 to 50 $cm^2$. If the area of the unit section is about 5 to 50 $cm^2$, the pressure loss will not be large, and a thermal stress developed in the honeycomb structure can be dispersed and the honeycomb structure is not likely to crack when it is applied with the thermal stress. To have a marked operations and effects, the area of the unit section should more preferably be about 6 to 40 $cm^2$ or about 8 to 30 $cm^2$.

The honeycomb block formed from an assembly of a plurality of the honeycomb units 20 that is substantially the honeycomb structure, should preferably be formed, for example, pillar-shaped, square-pillar shaped or elliptic pillar shaped one.

The base material (skeletal component) of the honeycomb unit may be inorganic particles, fibers or whiskers of any one selected from among, for example, nitride ceramics such as aluminum nitride, silicon nitride, boron nitride, titanium nitride, etc., carbide ceramics such as silicon carbide, zirconium carbide, titanium carbide, tantalum carbide, tungsten carbide, etc. and oxide ceramics such as alumina, zirconia, cordierite, mullite, etc. Among these materials, the silicon carbide ceramics excellent in thermal resistance and mechanical properties and high in thermal conductivity is preferably usable. Especially, ceramic containing metallic silicon, silicon- or silicate compound-bonded ceramic or the like may be suitably usable. It should be noted that the silicon carbide ceramic includes a ceramic formed from only silicon carbide as well as a ceramic in which silicon carbide is bonded by a metal, crystalloid or amorphous compound.

In addition to the above-mentioned skeletal component (base material), the material of the honeycomb unit may contain a sub component (material). That is, the honeycomb unit may be a "hybrid type honeycomb unit".

The hybrid type honeycomb unit should preferably contain at least inorganic ceramic particles and inorganic binder as base material and also a heterogeneous inorganic material (reinforcing material) as sub material. Since the inorganic ceramic particles can be bound together by the inorganic binder, such a honeycomb unit can be strong enough to stably maintain the honeycomb shape.

Note here that in the hybridization of the inorganic materials as base material and sub material, respectively, the main and sub materials are different in components from each other, or they are identical in components to each other but different in shape from each other (for example, in particle size, aspect ratio, etc.) and physicality (for example, in crystal form, melting temperature, etc.). The hybridization of the honeycomb unit effectively contributes to an improved strength of the honeycomb structure.

The inorganic material as sub material may be ceramic particles of one or more than one selected from among, for example, silicon carbide, silicon nitride, alumina, silica, zirconia, titania, ceria, zeolite and mullite. Also, an inorganic fiber as the sub material, if applicable, may be fibers of one or more than one selected from among, for example, alumina fiber, silica fiber, silicon carbide fiber, silica alumina fiber, glass fiber, potassium titanate fiber and aluminum borate fiber. Also, whiskers as the sub material, if applicable, may be whiskers of one or more than one selected from among, for example, alumina, silica, zirconia, titania, ceria, zeolite and mullite.

The hybrid type honeycomb unit is produced using the inorganic binder for the latter is considered to effectively assure a sufficient strength of the honeycomb unit even if baking is made at a low temperature. The inorganic binder may be, for example, inorganic sol, clay binder or the like. For example, an inorganic sol of one or more than one selected from among, for example, alumina, silica, titania and water glass may be used as the inorganic binder. Also, one or more than one selected from among, for example, clay, china clay, montmorillonite, double-chain structure clay (sepiolite and attapulgite), etc. may be used as the clay binder.

Figure 3:
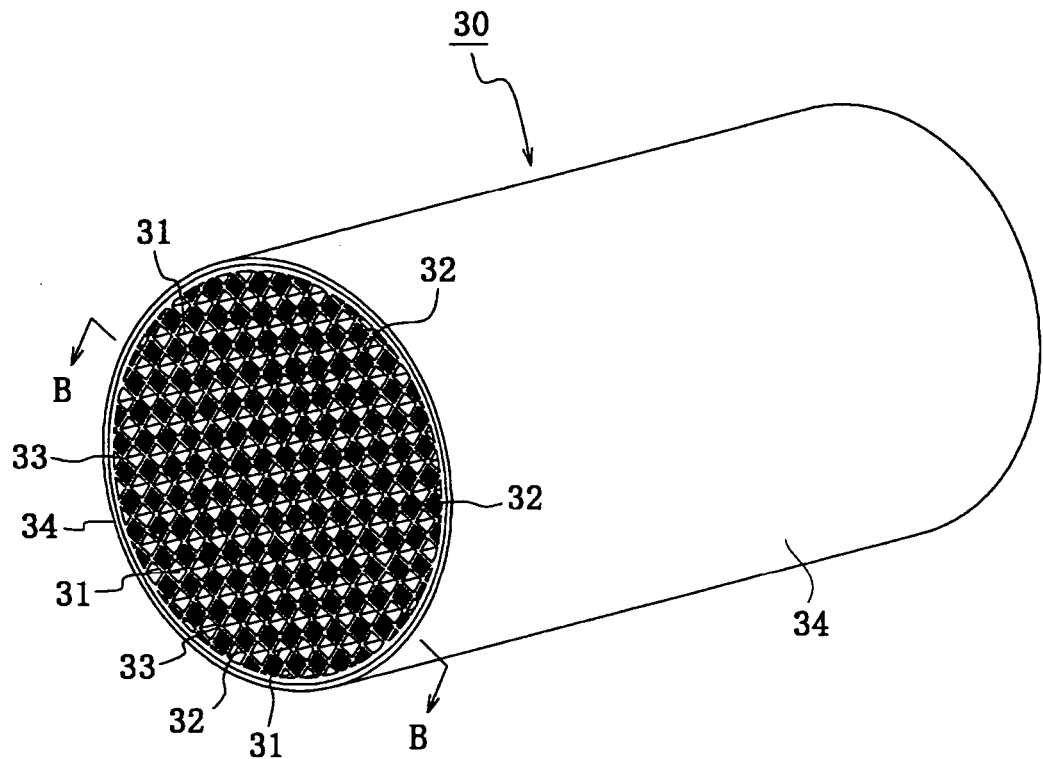
FIG. 3(a) is a perspective view of the integral type honeycomb structure.
FIG. 3(b) is a sectional view taken along the line B-B in FIG. 3(a).
Figure 3:
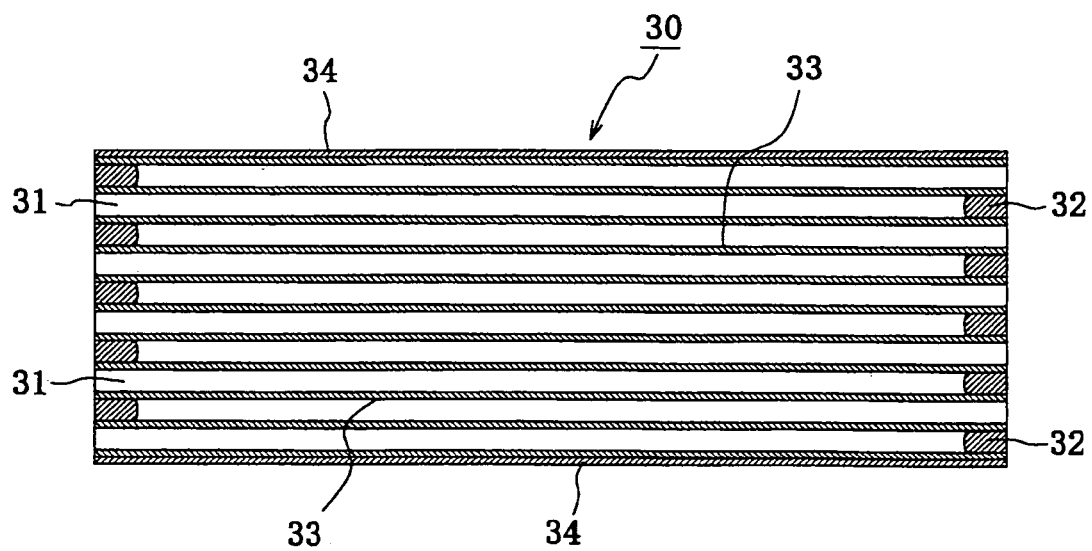

Referring here to FIG. 3(*a*), there is schematically illustrated in the form of a perspective view an example of the integral type honeycomb structure (honeycomb monolith) as a second embodiment of the present invention. FIG. 3(*b*) is a sectional view taken along the line B-B in FIG. 3(*a*). As shown, the integral type honeycomb structure, generally indicated with a reference numeral 30, is a single cylindrical honeycomb monolith formed by assembling together a plurality of cells (through-holes) 31 longitudinally side by side with cell walls 33 laid between adjacent cells. Such integral type honeycomb structure is similar in configuration to the aggregate type honeycomb structure except the single honeycomb monolith is manufactured by sintering.

The integral type honeycomb structure 30 has formed on the outer surface of the honeycomb monolith a sealant layer (also called "coating layer") 34 provided to prevent exhaust gas from leaking and reinforce the honeycomb monolith.

Each of these honeycomb structures according to the present invention is usable as an exhaust gas purifying filter to remove particulates in the exhaust gas. In this case, the porosity of the honeycomb unit should preferably be about 20 to 80%, and more preferably about 50 to 70%. If the porosity of the honeycomb unit is about 20 to 80%, the pressure loss of the filter is not likely to be higher, and the honeycomb structure will not have a decreased strength and thus will not possibly be broken easily. It should be noted that in case a catalyst is added to the cell walls and the latter are used as a catalyst carrier, the pressure loss in the honeycomb structure will easily be higher. On this account, the porosity of the cell walls should desirably be about 50 to 70%. Also note that the porosity is measured by a conventional well-known method such as the mercury injection method, Archimedes method and SEM (scanning electron microscopy).

In case each of these honeycomb structures is used as an exhaust gas purifying filter to purify exhaust gas by trapping particulates in the exhaust gas, the mean pore diameter of the honeycomb unit should preferably formed from a ceramic material of about 5 to 100 μm in mean pore diameter. If the mean pore diameter is about 5 to 100 μm, the pressure loss of the filter against the exhaust gas will not be higher, and the particulates in the exhaust gas will not pass through the pores more easily and thus be trapped more effectively.

The kind of a material used to form the sealant layer is selected based on a predetermined pyschometric lightness (L*) (< about 60) as mentioned above. The material may be, for example, a mixture of oxide ceramic particles and inorganic binder, whose pyschometric lightness (L*) should desirably be small, a mixture of oxide ceramic particles, inorganic fiber and inorganic binder, whose pyschometric lightness (L*) is small, a mixture of oxide ceramic particles, inorganic particles and inorganic binder, whose pyschometric lightness (L*) is small, a mixture of oxide particles, inorganic fiber, inorganic particles and inorganic binder, whose pyschometric lightness (L*) is small, or any one of these mixtures to which an organic binder is added. Any one of these materials whose pyschometric lightness (L*) is less than about 60 may be used as the sealant layer.

The oxide ceramic particles may be fibers or whiskers of any one selected from among, for example, alumina, silica, titania, zirconia, cordierite, mullite and the like. Each of these materials may be used singly or more than one of them be used in combination.

The above inorganic binders include, for example, silica sol, alumina sol and the like. Each of them may be used singly or more than one of them be used in combination. Among these inorganic binders, silica sol should desirably be used.

The above inorganic fibers include, for example, ceramic fibers of silica-alumina, mullite, alumina, silica and the like. Each of them may be used singly or more than one of them be used in combination. Among these inorganic fibers, the ceramic fiber of silica-alumina should desirably be used.

Desirably, the inorganic particles used should basically be of less than about 60 in pyschometric lightness (L*). For example, ceramic of carbide, nitride or the like may be used. However, an inorganic powder or whisker of silicon nitride, boron nitride or the like should preferably be used.

As the organic binder, there may be used any one or more than one selected from among, for example, polyvinyl alcohol, methyl cellulose, ethyl cellulose, carboxymethyl cellulose, etc.

Figure 4:
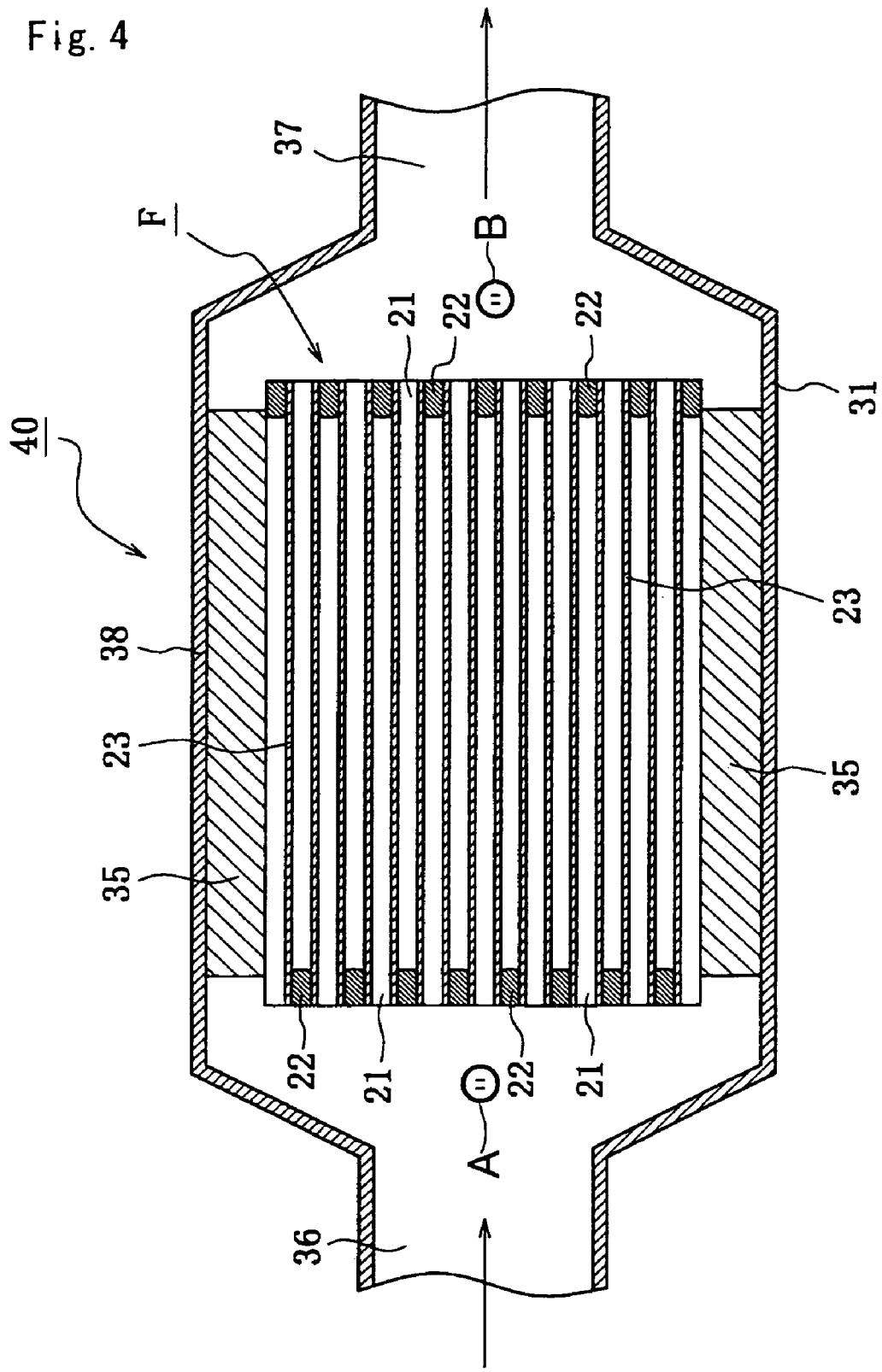
FIG. 4 is a sectional view of the on-vehicle exhaust gas purifying apparatus using the honeycomb structure according to the present invention.

The above-mentioned honeycomb structure may be used as an exhaust gas purifying filter. FIG. 4 shows an example of the on-vehicle exhaust gas purifying apparatus in which the honeycomb structure according to the present invention is used as an exhaust gas purifying filter. As shown, the exhaust gas purifying apparatus, generally indicated with a reference numeral 40, includes an exhaust gas purifying filter F formed from the honeycomb structure, a casing 38 to cover the outer surface of the exhaust gas purifying filter F, a hermetic sealing member 35 to be interposed between the exhaust gas purifying filter F and casing 38, and a heating means (not shown) provided at an exhaust gas inlet as necessary. An inlet pipe 36 connected to an engine such as an internal combustion engine is connected to an end of the casing 38 where exhaust gas is introduced, and an exhaust pipe 37 connected to outside is connected to the other end of the casing 38.

Exhaust gas coming from the internal combustion engine is passed through the inlet pipe 36, introduced into the exhaust gas purifying apparatus 40, and flows into the exhaust gas purifying filter F through cells open at their inlet ends (outlet ends are sealed with a sealant 22). When the exhaust gas passes through cell walls 23, particulates in the exhaust gas are captured by the cell walls 23. Thus, the exhaust gas is purified, then discharged through cells open at their outlet ends to outside the exhaust gas purifying filter F, and exhausted to outside through the exhaust pipe 37. It should be noted that in case gas component, not particulate, is to be purified by the exhaust gas purifying apparatus 40, the sealant 22 is unnecessary.

Also, in this exhaust gas purifying apparatus 40, the particulates will be massively deposited on the cell walls 23 of the exhaust gas purifying filter F, and when the pressure loss becomes large, the filter F is to be regenerated. In this regeneration, the exhaust gas heated by a heating means such as catalyst, heater and the like provided as necessary is made to flow back into the cells 21 of the exhaust gas purifying filter F to heat the latter and the particulates deposited on the cell walls 23 are removed by burning.

Next, there will be explained an example of the method of producing the honeycomb structure according to the present invention:

First, a material paste containing mainly he aforementioned material (one kind for a normal honeycomb unit while an inorganic material as the base material, inorganic material as the sub material, inorganic binder, etc. for a hybrid type honeycomb unit) is prepared, and the paste is extrusion-molded to prepare a green molding of a honeycomb unit. To the material paste, there may appropriately be added an organic binder, dispersant and molding additive in addition to the above. The organic binder may be one or more than one selected from among, for example, methyl cellulose, carboxymethyl cellulose, hydroxyethyl cellulose, polyethylene glycol, phenol resin and epoxy resin. The proportion of this organic binder should preferably be about 1 to 10% by mass in relation to 100 parts by mass in total of the inorganic material of the first type, inorganic material of the second type and inorganic binder. The dispersant may be, for example, water, organic solvent (such as benzene or the like) or alcohol (such as methanol or the like) The molding additive may be, for example, ethylene glycol, dextrine, fatty acid, fatty acid soap or polyalcohol.

The material paste should preferably be kneaded sufficiently by a mixer, attritor, kneader or the like, for example. The material paste should preferably be extrusion-molded to form the cells and cell walls.

Next, the green molding is dried by a microwave dryer, hot-air dryer, dielectric dryer, reduced-pressure dryer, vacuum dryer or freeze-dryer. Then, the cells are closed at one of their opposite ends with a plug and the molding is dried.

Next, the green molding is degreased. The degreasing conditions are to be adjusted according to the type and volume of the organic material in the green molding. For example, the degreasing should preferably be done at about 400° C. for about 2 hours. Then, the green molding thus dried and degreased is baked. The baking should preferably be done at a temperature of about 600 to 2200° C., for example. Especially, a green molding of oxide ceramic should preferably be baked in an inactive-gas atmosphere at about 600 to 1200° C. With the above operations, there can be produced a honeycomb unit formed from a porous ceramic member having a honeycomb structure including a plurality of cells.

Thereafter, on the surface of the honeycomb unit, there is formed an oxide film by heat treatment of the honeycomb unit thus baked in an acidized atmosphere at a temperature of about 700° C. or more or an oxide layer by coating an oxide ceramic as necessary.

Next, the sealant paste prepared from the aforementioned materials is applied to the outer surface of the honeycomb unit thus prepared to provisionally join a plurality of such honeycomb units (16 pieces in the embodiment shown in FIG. 1) together.

Then, the honeycomb units thus provisionally joined together are stably joined to each other by drying to provide a honeycomb block (honeycomb structure) having predetermined dimensions. Namely, the honeycomb block is an assembly of the honeycomb units. The drying temperature for stabilizing the honeycomb units joined together should normally be within a range of about 100 to 200° C., which temperature varies a little depending upon the type and volume of the organic material in the green molding.

Note that the sealant layer 11 provided between the adjacent honeycomb units may be compact but it may also be porous to permit the exhaust gas to flow through However, at least the coating layer 12 as the outermost layer should desirably be a compact layer for the reason that when the aggregate type honeycomb structure according to the present invention is installed in an exhaust gas passage of an internal combustion engine, the coating layer 12 has to prevent the exhaust gas from leaking out from the outer surface of the honeycomb block.

The sealant layer 11 used to join the honeycomb units together should preferably be about 0.3 to 3 mm in thickness. If the thickness of the sealant layer 11 is about 0.3 to 3 mm, it is possible to assure any sufficient adhesion strength, and it will not possibly lead to a larger pressure loss.

A sealant may be applied to the outer surface, that is, lateral side face, of the honeycomb structure and stabilized by drying to form the sealant layer (coating layer) 12. The coating layer 12 should desirably be formed to protect the outer surface of the honeycomb units and reinforce the honeycomb units. The material of the sealant for the coating layer 12 is not limited to any special one, but it may be the same as, or different from that of the sealing layer 11. The coating layer should preferably be about 0.1 to 3 mm thick. If the thickness is about 0.1 to 3 mm, the outer surface of the honeycomb block can sufficiently be protected, which may not possibly lead to gas leakage, and can be reinforced. Further, it will not lead to cracking in the honeycomb structure when the latter is applied with a thermal stress, and will not lead to a larger pressure loss. The coating layer may be dried and stabilized under almost the same conditions as those for the sealant layer.

After joining the honeycomb units together to each other with the sealant layer or forming the coating layer, the assembly of honeycomb units is preliminarily baked. With this preliminary baking, the assembly can be degreased in case the sealant and coating layers contain any organic binder. The preliminary baking is effected under conditions which should appropriately be determined according to the type and volume of an organic material, if any, in the honeycomb unit assembly, but it should preferably be done at a temperature of about 400 to 800° C. for a time of about 1 to 2 hours. Even if the honeycomb structure thus subjected to the preliminary baking is used at a high temperature, it will not discharge any exhaust gas contaminated by any burnt organic binder in the honeycomb structure for the organic binder has already been removed by burning at the time of the preliminary baking.

Also, the honeycomb structure thus obtained yet carries a catalyst component, and so it may be used as a honeycomb catalyst. The catalyst component may be a noble metal, alkali metal compound, alkali earth metal compound, oxide or the like. As the noble metal, there may be used one or more than one selected from among, for example, platinum, palladium and rhodium. The alkali metal compound may be one or more than one selected from among, for example, potassium, sodium and the like. The alkali earth metal compound may be a compound of barium or the like, for example. The oxides for use as the catalyst component may be perovskite (La: 0.75, K: 0.25, MnO: 3, etc.), $CeO_2$ or the like. The honeycomb catalyst may be the so-called three-component catalyst or $NO_x$ occlusion catalyst for use in the on-vehicle exhaust gas purifying apparatus.

EXAMPLES

The examples of the present invention will be described in further detail, but the present invention is not limited to these examples.

(Tests)

The examples of the present invention were tested to evaluate the action and effect of the sealant layer (adhesive and coating material) formed on the outer surfaces of the silicon carbide based honeycomb units and sealant layer formed on the outer surfaces of the cordierite honeycomb monolith. The sealant layer the silicon carbide based honeycomb unit was different in coloring agent from that on the cordierite honeycomb monolith.

(Preparing the Sealant Paste)

Thirteen types of sealant pastes were prepared. Each of the pastes was composed as shown in Table 1.

The paste No. 1 was a heat-resistant sealant paste that is a mixture of 25% by mass of an inorganic powder (α-alumina particles of 0.5 μm in mean size), 5% by mass of iron oxide, 10% by mass of inorganic fiber (silica-alumina fiber of 10 μm in mean diameter and 200 μm in mean length), 30% by mass of silica sol (30% by mass in concentration), 5% by mass of carboxymethyl cellulose and 25% by mass of water.

Similarly, other 12 types of pastes were prepared which were different in proportion of the material powder, inorganic fiber, silica sol and carboxymethyl cellulose from the paste No. 1 and each other as shown in Table 1.

(Measuring the Pyschometric Lightness)

Each of the above pastes was shaped to a diameter of 50 mm and thickness of 5 mm, solidified at 120° C., and then heat-treated at 600° C. for 3 hours. The pyschometric lightness (L*) of each of the 13 types of samples was measured by a spectrocolorimeter (SPECTRO COLOR METER Model SQ2000 by the Nippon Denshoku). The results of measurement are also shown in Table 1.

TABLE 1

| Paste | Inorganic powder: α-alumina % by mass | Inorganic powder: Zirconia % by mass | Coloring agent: Fe$_2$O$_3$ % by mass | Mean particle size of inorganic powders μm | Silica-alumina fiber (200 μm in length; 10 μm in diameter) % by mass | Silica-sol solid content: 30% by mass % by mass | Carboxy-methyl cellulose % by mass | Water % by mass | Psycho-metric lightness L* |
|---|---|---|---|---|---|---|---|---|---|
| 1 | 25 | 0 | 5 | 0.5 | 10 | 30 | 5 | 25 | 86.10 |
| 2 | 20 | 0 | 10 | 0.5 | 10 | 30 | 5 | 25 | 75.93 |
| 3 | 15 | 0 | 15 | 0.5 | 10 | 30 | 5 | 25 | 65.76 |
| 4 | 10 | 0 | 20 | 0.5 | 10 | 30 | 5 | 25 | 55.58 |
| 5 | 5 | 0 | 25 | 0.5 | 10 | 30 | 5 | 25 | 45.41 |
| 6 | 0 | 30 | 0 | 0.5 | 10 | 30 | 5 | 25 | 87.28 |
| 7 | 0 | 25 | 5 | 0.5 | 10 | 30 | 5 | 25 | 78.60 |
| 8 | 0 | 20 | 10 | 0.5 | 10 | 30 | 5 | 25 | 69.93 |
| 9 | 0 | 15 | 15 | 0.5 | 10 | 30 | 5 | 25 | 61.26 |
| 10 | 0 | 10 | 20 | 0.5 | 10 | 30 | 5 | 25 | 52.58 |
| 11 | 0 | 5 | 25 | 0.5 | 10 | 30 | 5 | 25 | 43.91 |
| 12 | 0 | 0 | 30 | 0.5 | 10 | 30 | 5 | 25 | 35.24 |
| 13 | 30 | 0 | 0 | 0.5 | 10 | 30 | 5 | 25 | 96.27 |

(Producing Aggregate Type Honeycomb Structures)

Two types of aggregate type honeycomb structures were produced as will be described below:

(1) Producing a Silicon Carbide Honeycomb Structure (Preparing a Silicon Carbide Honeycomb Unit)

A honeycomb unit was formed a mixture of 80% by mass of a silicon carbide powder (particles of 8.5 μm in mean diameter) and 20% by mass of a silicon carbide powder (particles of 0.2 μm in mean diameter).

Next, 10 parts by mass of methyl cellulose as molding additive was added to the 100 parts by mass of the material powders and they were mixed together. Further, 18 parts by mass of a dispersant composed of an organic solvent and water were added to the mixture and all these materials were kneaded together. Finally, the paste thus prepared was extrusion-molded by a mold designed for an intended honeycomb shape to provide a honeycomb molding having many through-holes (cells), and the honeycomb molding was closed at either of the opposite ends of the through-holes with a plug to have checkered-pattern ends. The honeycomb molding was dried at 150° C., degreased at 500° C. and then baked in an inactive-gas atmosphere at 2200° C. to form a honeycomb unit having dimensions of 34.3×34.3×150 mm.

Note that the pyschometric lightness (L*) on the surface of the honeycomb unit thus formed was measured as in the pyschometric-lightness measurement of the sealant-paste samples and the result of measurement was 40.23 (also shown in Table 2).

(2) Producing a Silicon Carbide-Silicon Honeycomb Structure (Preparing a Silicon Carbide-Silicon Honeycomb Unit)

A honeycomb unit was formed a mixture of 80% by mass of a silicon carbide powder (particles of 8.5 μm in mean diameter) and 20% by mass of a metallic silicon powder (particles of 0.2 μm in mean diameter).

Next, 10 parts by mass of methyl cellulose as molding additive was added to the 100 parts by mass of the material powders and they were mixed together. Further, 18 parts by weight of a dispersant composed of an organic solvent and water were added to the mixture and all these materials were kneaded together. Finally, the paste thus prepared was molded by a mold designed for an intended honeycomb shape to provide a honeycomb molding having many through-holes (cells), and the honeycomb molding was closed at either of the opposite ends of the through-holes with a plug to have checkered-pattern ends. The honeycomb molding was dried at 150° C., degreased at 500° C. and then baked in an inactive-gas atmosphere at 1400° C. to form a honeycomb unit having dimensions of 34.3×34.3×150 mm.

Note that the pyschometric lightness (L*) on the surface of the honeycomb unit thus formed was measured as in the pyschometric-lightness measurement of the sealant-paste samples and the pyschometric lightness (L*) measured was 44.67 (also shown in Table 3).

(Producing the Aggregate Type Honeycomb Structure)

Next, 16 samples of the honeycomb unit were prepared, and those of them which were equivalent in level to each other are joined together with the aforementioned sealant paste Nos. 1 to 13. The assembly of the honeycomb-unit samples were dried at 150° C. for 2 hours, and then based at 500° C. Thereafter, the assembly was cut at the periphery thereof using a diamond cutter to provide a cylindrical ceramic block.

Cylindrical exhaust gas purifying honeycomb filters (of about 140 mm in diameter and 150 mm in length) were produced with the sealant layer and coating layer (outermost layer) being varied in thickness (A to D as shown in Tables 2 and 3) from one filter to another.

(Producing an Integral Type Honeycomb Structure)

(Producing a Cordierite-Made Integral Type Honeycomb Structure)

Forty parts by mass of a talc powder (10 μm in mean particle size), 10 parts by mass of china clay (9 μm in mean particle size), 17 parts by mass of alumina powder (9.5 μm in mean particle size), 16 parts by mass of aluminum hydroxide powder (5 μm in mean particle size), 15 parts by mass of silica powder (10 μm in mean particle size), 10 parts by mass of acrylic powder (40 μm in mean particle size), 5 parts by mass of methyl cellulose and 18 parts by mass of a dispersant composed of organic solvent and water were kneaded together.

Next, the mixture thus kneaded was molded by a mold designed for an intended honeycomb shape to provide a honeycomb molding having many through-holes, and the honeycomb molding was closed at either of the opposite ends of the through-holes with a plug to have checkered-pattern ends.

The molding was dried at 140° C., degreased at 400° C., and baked in the atmospheric air at 1400° C. to form an integral type honeycomb monolith of 143.8 mm in diameter and 150 mm in length.

After the cell walls were flattened, the pyschometric lightness (L*) on the surface of the sample was measured as in the pyschometric-lightness measurement of the sealant-paste samples and the result of measurement was 58.67 (also shown in Table 4).

Cylindrical exhaust gas purifying filters were produced with the coating layer (outermost layer) being varied in thickness (A to D as shown in Tables 4) from one filter to another.

TABLE 2

(° C.)

| | | A | | B | | C | | D | |
|---|---|---|---|---|---|---|---|---|---|
| Paste | Pyschometric lightness L* | Sealant layer thickness 0.3 mm | Coating layer thickness 0.3 mm | Sealant layer thickness 0.5 mm | Coating layer thickness 0.5 mm | Sealant layer thickness 1.0 mm | Coating layer thickness 1.0 mm | Sealant layer thickness 3.0 mm | Coating layer thickness 3.0 mm |
| 1 | 86.00 | 450 | | 455 | | 460 | | 470 | |
| 2 | 75.93 | 460 | | 465 | | 470 | | 480 | |
| 3 | 65.76 | 470 | | 475 | | 480 | | 490 | |
| 4 | 55.58 | 520 | | 525 | | 530 | | 540 | |
| 5 | 45.41 | 530 | | 535 | | 540 | | 550 | |
| 6 | 87.28 | 443 | | 448 | | 453 | | 463 | |
| 7 | 78.60 | 453 | | 458 | | 463 | | 473 | |
| 8 | 69.93 | 465 | | 470 | | 475 | | 485 | |
| 9 | 61.26 | 466 | | 471 | | 476 | | 486 | |
| 10 | 52.58 | 530 | | 535 | | 540 | | 550 | |
| 11 | 43.91 | 540 | | 545 | | 550 | | 560 | |
| 12 | 35.24 | 553 | | 558 | | 563 | | 573 | |
| 13 | 96.27 | 430 | | 430 | | 430 | | 430 | |
| SiC filter | 40.23 | — | | — | | — | | — | |

TABLE 3

(° C.)

| | | A | | B | | C | | D | |
|---|---|---|---|---|---|---|---|---|---|
| Paste | Pyschometric lightness L* | Sealant layer thickness 0.3 mm | Coating layer thickness 0.3 mm | Sealant layer thickness 0.5 mm | Coating layer thickness 0.5 mm | Sealant layer thickness 1.0 mm | Coating layer thickness 1.0 mm | Sealant layer thickness 3.0 mm | Coating layer thickness 3.0 mm |
| 1 | 86.00 | 448 | | 453 | | 458 | | 468 | |
| 2 | 75.93 | 458 | | 463 | | 468 | | 478 | |
| 3 | 65.76 | 468 | | 473 | | 478 | | 488 | |
| 4 | 55.58 | 518 | | 523 | | 528 | | 538 | |
| 5 | 45.41 | 528 | | 532 | | 538 | | 548 | |
| 6 | 87.28 | 440 | | 445 | | 450 | | 460 | |
| 7 | 78.60 | 450 | | 455 | | 460 | | 470 | |
| 8 | 69.93 | 463 | | 468 | | 473 | | 482 | |
| 9 | 61.26 | 466 | | 468 | | 473 | | 483 | |
| 10 | 52.58 | 527 | | 532 | | 538 | | 548 | |
| 11 | 43.91 | 538 | | 543 | | 548 | | 558 | |
| 12 | 35.24 | 550 | | 555 | | 560 | | 570 | |
| 13 | 96.27 | 428 | | 428 | | 428 | | 428 | |
| Si—SiC filter | 44.67 | — | | — | | — | | — | |

TABLE 4

| Paste | Psychometric lightness L* | A Coating layer thickness 0.3 mm | B Coating layer thickness 0.5 mm | C Coating layer thickness 1.0 mm | D (°C.) Coating layer thickness 3.0 mm |
|---|---|---|---|---|---|
| 1 | 86.00 | 450 | 455 | 460 | 470 |
| 2 | 75.93 | 460 | 465 | 470 | 480 |
| 3 | 65.76 | 470 | 475 | 480 | 490 |
| 4 | 55.58 | 520 | 525 | 530 | 540 |
| 5 | 45.41 | 530 | 535 | 540 | 550 |
| 6 | 87.28 | 443 | 448 | 453 | 463 |
| 7 | 78.60 | 453 | 458 | 463 | 473 |
| 8 | 69.93 | 465 | 470 | 475 | 485 |
| 9 | 61.26 | 466 | 471 | 476 | 486 |
| 10 | 52.58 | 530 | 535 | 540 | 550 |
| 11 | 43.91 | 540 | 545 | 550 | 560 |
| 12 | 35.24 | 553 | 558 | 563 | 573 |
| 13 | 96.27 | 440 | 440 | 440 | 440 |
| Cordierite filter | 58.67 | — | — | — | — |

(Evaluation)

Each of the honeycomb structures A to D shown in Tables 2 to 4 was disposed in the exhaust gas passage of an exhaust gas purifying apparatus provided for a diesel engine of 2000 cc displacement as shown in FIG. 4, and the engine was driven at 3000 rpm and 50 Nm. A thermocouple A was installed just before a filter inside an exhaust pipe 37 while a thermocouple B was in a position 10 cm just after that filter to measure the temperature. When the exhaust gas was stably at a temperature of 430° C. at the filter inlet (measuring point A) in about 10 minutes after the engine was put into run, the exhaust gas temperature was measured at the filter outlet (measuring point B). The relation between the temperatures and pastes in the SiC aggregate type filter is shown in Table 2, such a relation in the Si—SiC aggregate type filter is shown in Table 3, and such a relation in the cordierite integral type filter is shown in Table 4.

As will be seen from Tables 2 to 4, in case the sealant layers formed in each filter were 0.3 mm or more and they were colored to reduce the pyschometric lightness (L*), the filters had a higher temperature. For example, in a sample A in which the sealant layer was of the paste No. 1 of 86.00 in L* and 0.3 mm thick in the SiC aggregate type filter shown in Table 2, the temperature at the filter outlet was 450° C. In a sample D in which the sealant layer was of the paste No. 1 and 3.0 mm thick, the temperature at the filter outlet was 470° C. These test results are almost the same as the filter outlet temperatures of 443° C. and 463° C. in the samples A and B in which the sealant layer was of the paste No. 6 of 87.28 in L*. However, When the paste No. 12 very dark in color (L*=35.24) was used, the filter outlet temperatures at the measuring points A and B were 553° C. and 573° C., respectively. That is, the filter outlet temperatures were higher, which reveals that the filters have an improved effect of keeping warmth.

More specifically, when the pyschometric lightness (L*) was 86.0 or less, and more preferably, 60.00 or less (as in the paste Nos. 4, 5 and 10 to 12), the filter outlet temperatures were higher by 90° C. or more than those in the filters not colored.

As having been described in the foregoing, the honeycomb structure according to the present invention is used as an exhaust gas purifying apparatus or filter for purifying exhaust gas discharged from an internal combustion engine, boiler, heating furnace, gas turbine or various industrial processes. It is usable as a diesel particulate filter (DPF) having an on-vehicle exhaust gas purifying catalyst carrier or having a function to filtrate and remove, by combustion, particulate matters in exhaust gas. Of course, it is utilizable for any other application (adsorption of gas and liquid components, for example) without carrying any catalyst component or for a similar application.

What is claimed is:

1. A honeycomb structure, comprising:
a plurality of honeycomb units;
an adhesive layer adhering together the plurality of honeycomb units,
wherein each of the honeycomb units has a plurality of cells, and
wherein each of the plurality of cells has two opposite ends and the cells adjacent to each other have a cell wall interposed therebetween, and the adhesive layer comprises oxide particles, an inorganic binder, and a coloring agent, whereby the addition of the coloring agent into the adhesive layer lowers the psychometric lightness (L*) of the adhesive layer.

2. The honeycomb structure according to claim 1, wherein the honeycomb structure has a coating layer adhering to an outer peripheral surface of the honeycomb structure.

3. The honeycomb structure according to claim 2, wherein the adhesive layer and the coating layer each has a psychometric lightness (L*) specified in JIS Z 8729 (CIE (1976)) of about 86.00 or less.

4. The honeycomb structure according to claim 1, wherein the coloring agent comprises one or more inorganic compounds selected from iron oxide, copper oxide, $CoO \cdot nAl_2O_3$, $Co_3(PO_4)_2$, or other cobalt compounds.

5. The honeycomb structure according to claim 1, wherein the oxide particle is selected from alumina, zirconia, titania, or silica.

6. The honeycomb structure according to claim 1, wherein one of the two opposite ends of the cell is sealed with a plug.

7. The honeycomb structure according to claim 1, wherein the honeycomb unit carries a catalyst component.

8. The honeycomb structure according to claim 1, wherein the honeycomb structure is used in purifying the exhaust gas from a vehicle.

9. A honeycomb structure, comprising
a honeycomb monolith having a plurality of cells;
a coating layer adhering to an outer peripheral surface of the honeycomb structure,
wherein each of the plurality of cells has two opposite ends and the cells adjacent to each other have a cell wall interposed therebetween, and the coating layer comprises oxide particles, an inorganic binder, and a coloring agent, whereby the addition of the coloring agent into the coating layer lowers the psychometric lightness (L*) of the coating layer.

10. The honeycomb structure according to claim 9, wherein the coating layer has a psychometric lightness (L*) specified in JIS Z 8729 (CIE (1976)) of about 86.00 or less.

11. The honeycomb structure according to claim 9, wherein the coloring agent comprises one or more inorganic compounds selected from iron oxide, copper oxide, $CoO \cdot nAl_2O_3$, $Co_3(PO_4)_2$, or other cobalt compounds.

12. The honeycomb structure according to claim 9, wherein the oxide particle is selected from alumina, zirconia, titania, or silica.

13. The honeycomb structure according to claim 9, wherein one of the two opposite ends of the cell is sealed with a plug.

14. The honeycomb structure according to claim 9, wherein the honeycomb monolith carries a catalyst component.

15. The honeycomb structure according to claim 9, wherein the honeycomb structure is used in purifying the exhaust gas from a vehicle.

16. The honeycomb structure of claim 1, wherein the thickness of the adhesive layer is between 0.3 mm to 3 mm.

17. The honeycomb structure of claim 2, wherein the thickness of the coating layer is between 0.1 mm to 3 mm.

18. The honeycomb structure of claim 9, wherein the thickness of the coating layer is between 0.1 mm to 3 mm.

* * * * *

UNITED STATES PATENT AND TRADEMARK OFFICE
CERTIFICATE OF CORRECTION

PATENT NO. : 7,641,956 B2
APPLICATION NO. : 11/398602
DATED : January 5, 2010
INVENTOR(S) : Yoshida It is certified that error appears in the above-identified patent and that said Letters Patent is hereby corrected as shown below:

In claim 4, column 16, line 34, "$CoO.nAl_2O_3$," should read --$CoO \cdot nAl_2O_3$,--.

In claim 11, column 16, line 64, "$CoO.nAl_2O_3$," should read --$CoO \cdot nAl_2O_3$,--.

Signed and Sealed this

Twenty-third Day of March, 2010

David J. Kappos
*Director of the United States Patent and Trademark Office*